(12) United States Patent
Ishikawa et al.

(10) Patent No.: US 8,049,689 B2
(45) Date of Patent: Nov. 1, 2011

(54) DEVICES AND METHODS FOR SYNCHRONIZED ILLUMINATION

(75) Inventors: Tomohiro Ishikawa, Evanston, IL (US); Rick Latella, Woodstock, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 743 days.

(21) Appl. No.: 11/756,137

(22) Filed: May 31, 2007

(65) Prior Publication Data

US 2008/0297537 A1 Dec. 4, 2008

(51) Int. Cl.
*G09G 3/32* (2006.01)
(52) U.S. Cl. .......................................... 345/82; 345/83
(58) Field of Classification Search .................... 345/36, 345/39, 46, 48, 51, 77, 87, 102, 173, 211, 345/206, 690, 30, 55, 84; 349/64, 61, 65; 359/599; 362/612, 459, 487–489; 348/742, 348/602; 382/107; 340/815.45, 815.65
See application file for complete search history.

(56) References Cited

U.S. PATENT DOCUMENTS

| | | | | |
|---|---|---|---|---|
| 4,653,109 A * | 3/1987 | Lemelson et al. | ............. | 382/107 |
| 4,918,578 A * | 4/1990 | Thompson | ..................... | 362/634 |
| 6,204,832 B1 * | 3/2001 | Melville et al. | ................. | 345/55 |
| 6,561,660 B2 | 5/2003 | Huang | | |
| 6,888,529 B2 * | 5/2005 | Bruning et al. | ............... | 345/102 |
| 7,460,179 B2 * | 12/2008 | Pate et al. | ..................... | 348/602 |
| 7,578,607 B2 * | 8/2009 | Yamashita et al. | ............ | 362/339 |
| 7,750,821 B1 * | 7/2010 | Taborisskiy et al. | ..... | 340/815.45 |
| 2001/0019479 A1 * | 9/2001 | Nakabayashi et al. | .......... | 362/31 |
| 2002/0070914 A1 * | 6/2002 | Bruning et al. | ............... | 345/102 |
| 2002/0084992 A1 * | 7/2002 | Agnew | ........... | 345/173 |
| 2002/0167624 A1 * | 11/2002 | Paolini et al. | ................... | 349/61 |
| 2003/0160911 A1 * | 8/2003 | Kano | .............. | 349/65 |
| 2004/0008288 A1 * | 1/2004 | Pate et al. | ..................... | 348/742 |
| 2004/0105247 A1 * | 6/2004 | Calvin et al. | .................... | 362/31 |
| 2005/0237292 A1 * | 10/2005 | Kim et al. | ..................... | 345/102 |
| 2006/0007112 A1 * | 1/2006 | Park | .............. | 345/102 |
| 2006/0238487 A1 * | 10/2006 | Shih | .............. | 345/102 |
| 2007/0035707 A1 * | 2/2007 | Margulis | ....................... | 353/122 |
| 2007/0091338 A1 * | 4/2007 | Asada | ............. | 358/1.9 |
| 2007/0153543 A1 * | 7/2007 | Xu et al. | ...................... | 362/600 |
| 2007/0221935 A1 * | 9/2007 | Tseng et al. | .................. | 257/98 |
| 2007/0229303 A1 * | 10/2007 | Collier | ............ | 340/850 |
| 2007/0242477 A1 * | 10/2007 | Yoo et al. | ..................... | 362/612 |
| 2007/0279930 A1 * | 12/2007 | Aoki et al. | .................... | 362/561 |
| 2008/0007668 A1 * | 1/2008 | Mishima et al. | ................ | 349/58 |
| 2008/0055926 A1 * | 3/2008 | Yamashita et al. | ............ | 362/606 |
| 2008/0293453 A1 * | 11/2008 | Atlas et al. | .................... | 455/567 |

FOREIGN PATENT DOCUMENTS

EP 1551178 A1 7/2005
WO 2006003604 A1 1/2006

* cited by examiner

*Primary Examiner* — Prabodh M Dharia

(57) ABSTRACT

Disclosed is a display of a particular size that may be perceived as larger than the particular size as a result of light emitted by one or more light guides adjacent the perimeter of the display. The display may also be perceived as brighter. In particular, the display is configured to output a changing image. A light guide is disposed adjacent at least a portion of the perimeter of the display and coupled to a multicolor LED. A controller of the electronic device is configured to analyze the changing image to determine the color content. The multicolor LED is driven to emit light according to the color content of the changing image. The light guide is configured to couple light from the LED in a direction parallel to the display viewing surface, and to couple light out of the light guide in a direction away from the display viewing surface.

19 Claims, 6 Drawing Sheets

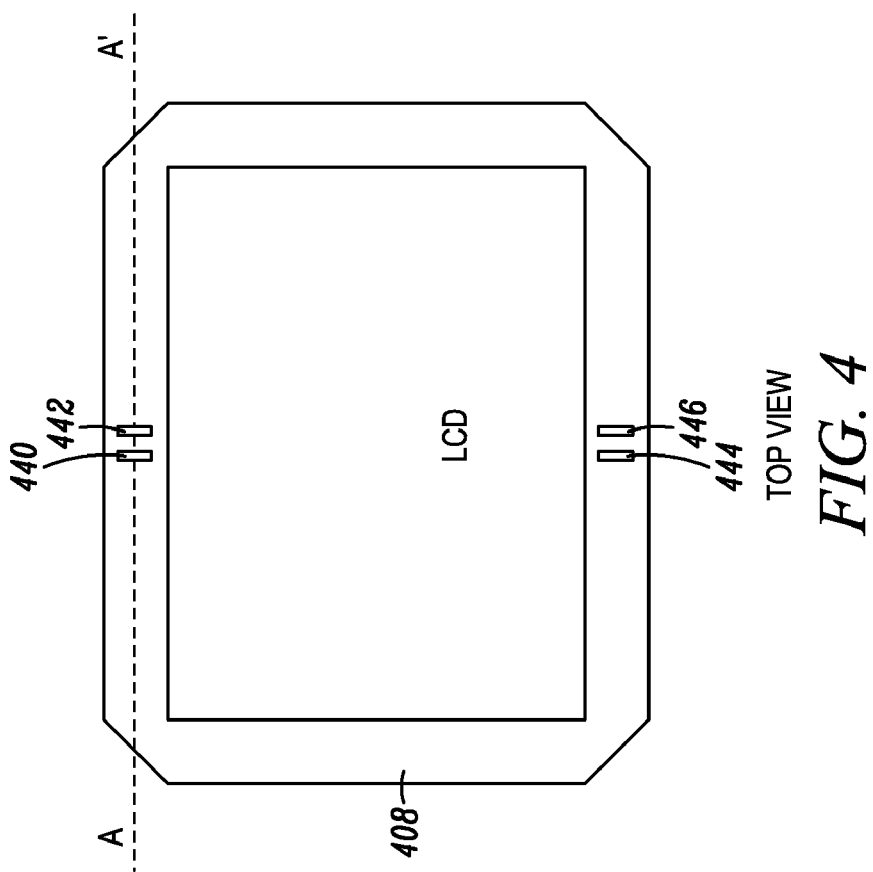
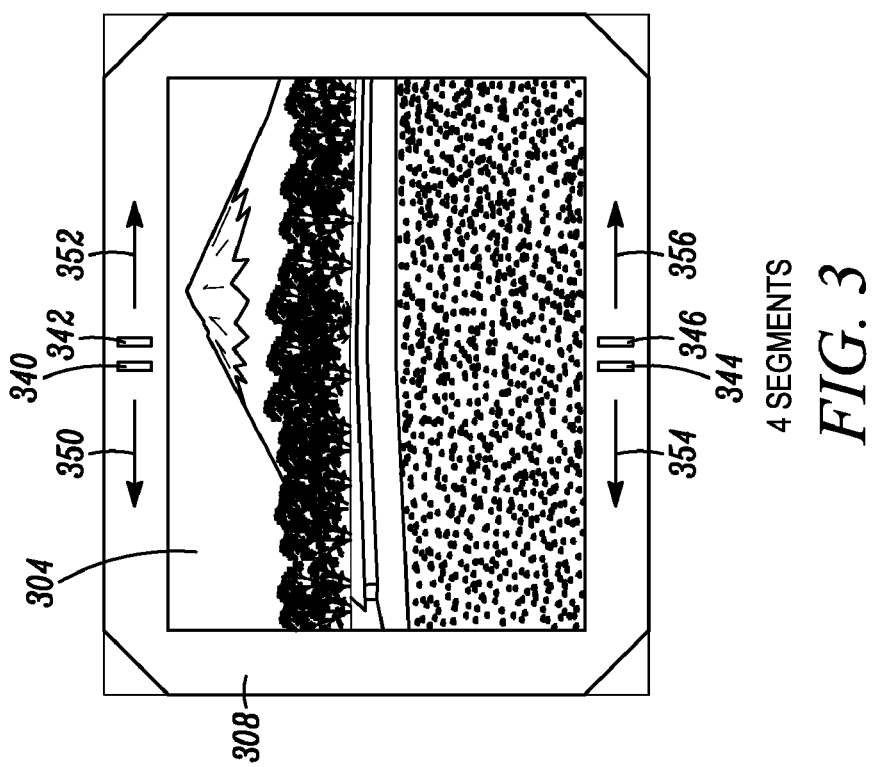
FIG. 4 TOP VIEW
FIG. 3 4 SEGMENTS

DEVICES AND METHODS FOR SYNCHRONIZED ILLUMINATION

FIELD

Disclosed are electronic devices and methods of electronic devices for illumination of a display periphery, and more particularly electronic devices and methods of electronic devices for illumination of a periphery of a display in synchronization with an image rendered to the display.

BACKGROUND

Manufacturers of electronic devices in particular, mobile communication devices, constantly strive to reduce costs of production while improving their products. Moreover, there is also a trend toward smaller mobile communication devices, at least in part based upon customer demand. Accordingly, manufacturers are inclined to keep the size of a display device to a minimum. Even though a user may prefer a smaller device, a user may also prefer a display with a bigger look.

There may be a trade-off between the desire of consumers toward smaller devices combined with manufacturers' desire to reduce costs with smaller displays, and users' preference for bigger and brighter displays. It may be beneficial if it were possible to satisfy both concerns so that a smaller display may have an extended or bigger look.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 illustrates light output from one or more light guides adjacent at least a portion of the perimeter of the display;

FIG. 4 is similar to FIG. 3, but is intended to illustrate the placement of the one or more multicolor LEDs in relation to the light guide;

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Disclosed is a display of a particular size that may be perceived as larger than its particular size as a result of light emitted by one or more light guides adjacent the perimeter of the display. The display may also be perceived as brighter. In particular, a display of a particular size is configured to output a changing image. A light guide is disposed adjacent at least a portion of the perimeter of the display and coupled to a multicolor LED. A controller of the electronic device is configured to analyze the changing image to determine the color content. The multicolor LED is driven to emit light according to the color content of the changing image. The light guide is configured to couple light from the LED in a direction parallel to the display viewing surface, and to couple light out of the light guide in a direction away from the display viewing surface. In this manner, while maintaining smaller display size it may be possible to create a bigger and/or brighter look.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

At least some inventive functionality and inventive principles may be implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Figure 1:
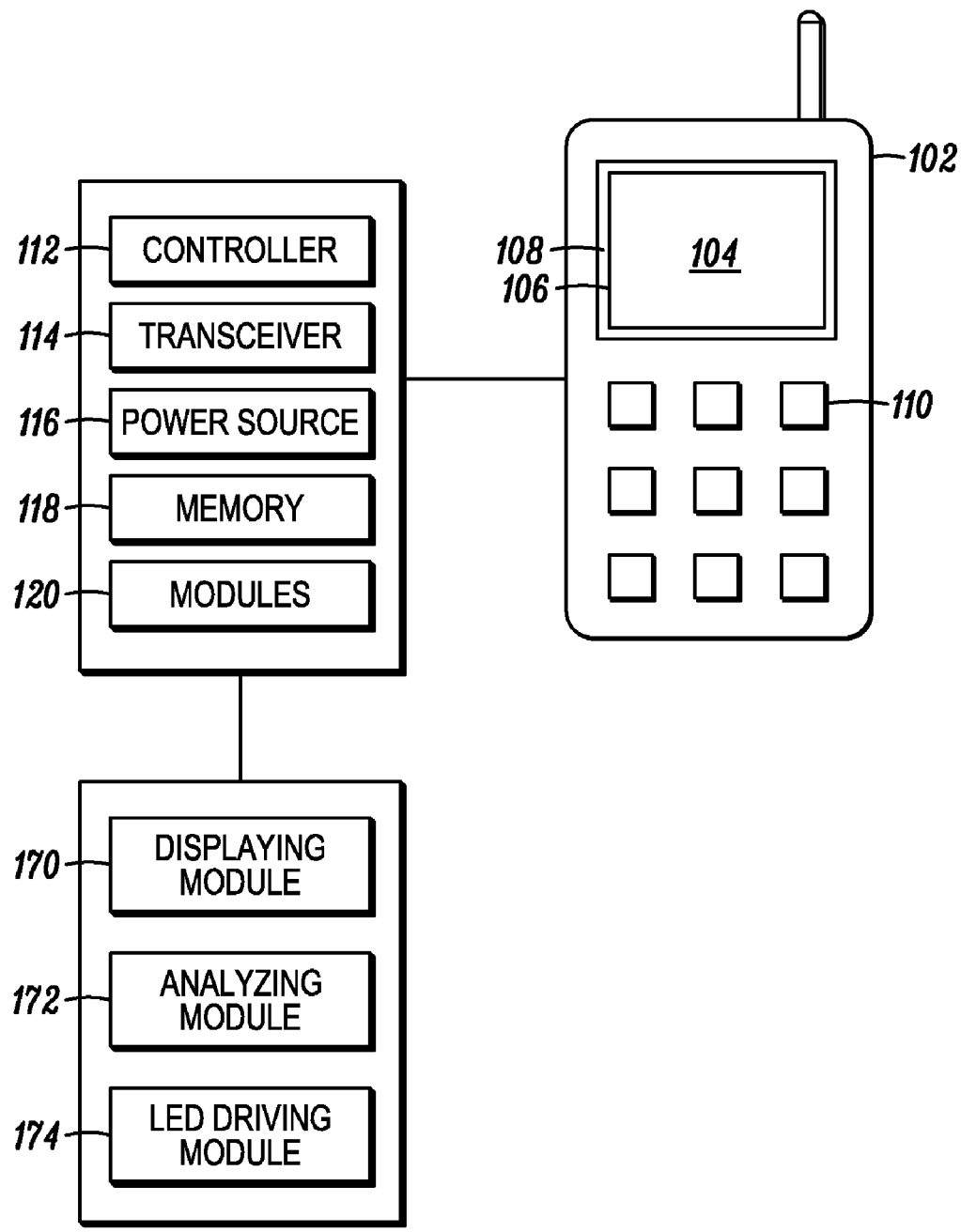
FIG. 1 illustrates an electronic device including a display having a perimeter and at least one light guide adjacent the perimeter.

FIG. 1 illustrates an electronic device 102 including a display 104 having a perimeter 106. Adjacent to at least a portion of the perimeter 106 is at least one light guide 108. The electronic device 102 can be any type of electronic device, for example, a mobile communication device. The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP). The previously-discussed electronic devices are mostly portable mobile communication devices. It is understood that the electronic device 102 can be of any type including a display, for example a digital camera, a portable DVD player, a music player, and an industrial device. It is further understood that the described electronic device 102 can of course be any type of electronic device including a display such as a television set, a monitor, and a projection screen.

While the electronic device 102 can be any type of device with a display, FIG. 1 depicts a mobile communication device 102 that can include a user interface such as a keypad 110, and other features for mobile communication. The electronic device 102 can include a controller 112, a transceiver 114, a power source 116, a memory 118, and modules 120. The modules can carry out certain processes of the methods as described herein. Steps of methods may involve modules and modules may be inferred by the methods discussed herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below. The operations of a displaying module 170, an analyzing module 172 and an LED driving module 174 are described below.

The display 104 may be coupled to the controller 112, the display having a display viewing surface and as mentioned a perimeter 106. The controller can be configured to drive a changing or fixed image on the display 104. The image may have a color content.

Figure 2:
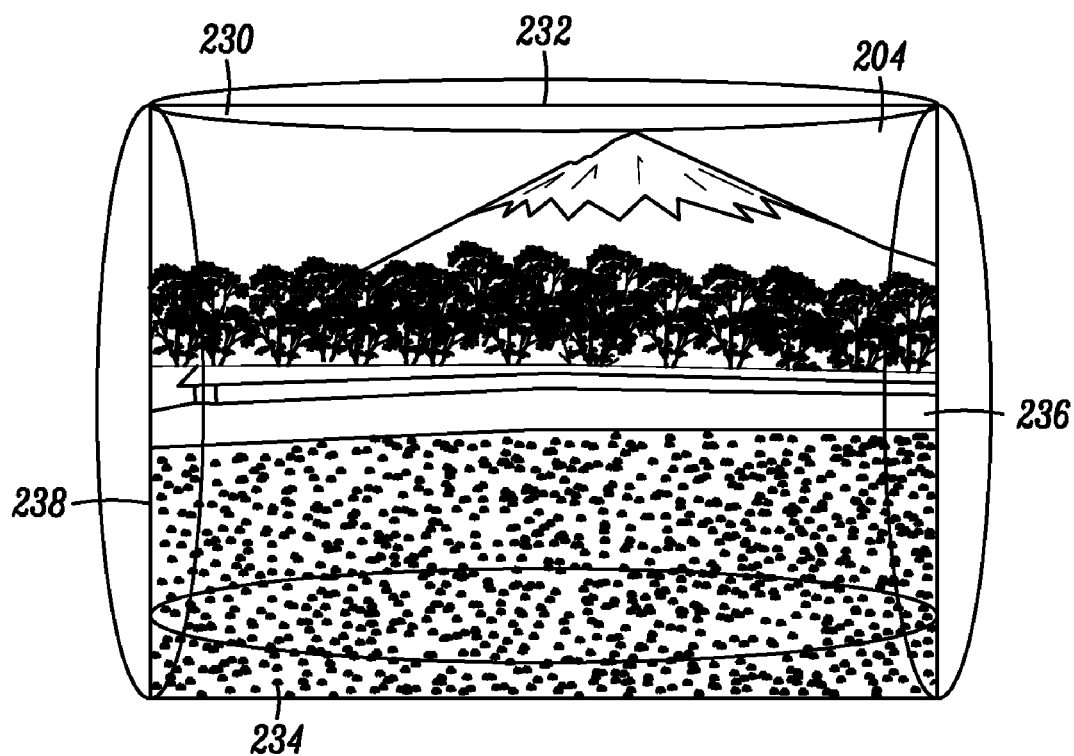
FIG. 2 illustrates an image in a display and indications of colors at the periphery of the display.

FIG. 2 illustrates an image 230 in a display 204 and indications of colors at the periphery of the display 204. An image 230 may be fixed or changing. The image 230 illustrated is displayed from the viewing surface of the display 204. While illustrated in black and white, color of the image 230 can be presumed by its content. Mount Fuji, surrounded by a blue sky, may be seen as a backdrop behind a meadow of yellow flowers. The sky at the top 232 of the image 230 is predominately blue. The foreground 234 of yellow flowers is predominately yellow. The side 236 includes a transition from yellow to blue. The side 238 also includes a transition from yellow to blue. The controller 112 (see FIG. 1) may be configured to analyze an image 230 to determine the color content. In this way, the color content may have a main color and an LED (see FIG. 3, below) coupled to the controller 112 may be driven to emit light of the same color as the main color of the changing image. When the image 230 is a changing image, the controller 112 may be configured to determine the changing image's color contents. The image 230 may occupy the display 204 that is a particular size and has a perimeter. The light guide 108 that may be adjacent at least a portion of the perimeter of the display 204 may output light of the colors mentioned above adjacent the perimeter so that the image of Mount Fuji may be enlarged and/or brightened with colored light corresponding to colors at the perimeter of the display 204. The light output from one or more light guides 108 that may be adjacent to at least a portion of the perimeter of the display 204, in this example, may include blue at the top 232 of the image 230, yellow at the bottom 234 of the image 230, transitioning from yellow to blue at the sides 236, 238 of the image 230.

FIG. 3 illustrates light output from one or more light guides 308 adjacent at least a portion of the perimeter of a display 304. The variation of depicted gray color of the light guide 308 of the black and white of the figure illustrates that there may be blue at the top 232 of the image 230 (see FIG. 2), yellow at the bottom 234 of the image 230, transitioning from yellow to blue at the sides 236, 238 of the image 230. The figure illustrates that the electronic device 102 (see FIG. 1) can include one or more multicolor LEDs 340, 342, 344 and/or 346 that can be coupled to the controller 112. The one or more multicolor LEDs 340, 342, 344, 346, such as red-green-blue (RGB) side emission LEDs, may be driven to emit light according to the color content of a changing image 230 that may be seen on the viewing surface of the display 304. The light guide 308 is configured to couple light from one or more LEDs in a direction, for example that which is depicted by arrows 350, 352, 354 and 356, the direction being parallel to the display viewing surface, and to couple light out of the light guide 308 in a direction away from the display viewing surface. The light guide 308 may be configured on the front face 558 (see FIG. 5 below) with a light diffusing surface topology so that the light may be coupled out of the light guide 308 away from the display viewing surface. The light wave guide 308 may be designed to benefit light extraction by including, for example, volume scatters and/or a surface lenticular structure, with a spatial gradient so as to distribute the light along the wave guide 308. The wave guide 308 may be approximately or less than 0.5 mm and the LEDs may be approximately or less than 0.5 mm.

In more detail, in one embodiment as shown in FIG. 3, there are a plurality of multicolor LEDs 340, 342, 344 and 346. In normal operation, the changing image comprises a plurality of different image portions, each portion having a color content; the controller 112 is configured to analyze the plurality of image portions to determine color content; and each multicolor LED of the plurality of multicolor LEDs 340, 342, 344 and 346 is disposed adjacent an image portion of the plurality of image portions, and is driven to emit light according to the color content of the image portion to which it is adjacent (on the viewing surface of the display 304), as detailed immediately above paragraph.

FIG. 4 is similar to FIG. 3, but is intended to illustrate the placement of the one or more multicolor LEDs 440, 442, 444 and/or 446 in relation to the light guide 408. Cross sectional line A-A' is referenced in FIG. 5. As mentioned, one or more LEDs may be RGB side emission LEDs. It is understood that any suitable source of light may be used.

Figure 5:
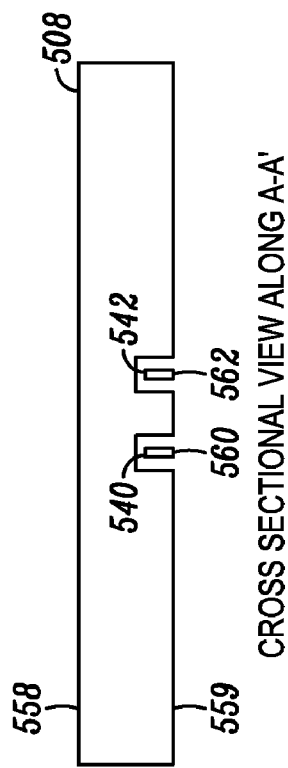
FIG. 5 depicts a cross sectional view along A-A' of FIG. 4 that illustrates the light guide may include grooves in which to dispose LEDs within the light guide.

FIG. 5 depicts a cross sectional view along A-A' of FIG. 4 that illustrates the light guide 508 may include grooves 560, 562 in which to dispose LEDs 540, 542 within the light guide 508. The light guide 508 may include a front face 558 adjacent the display viewing surface and a rear face 559 opposite the front face 558. The light guide 508 may define one or more grooves 560, 562 in the rear face 559. A multicolor side emission LED (for example, LED 540) may be disposed in groove 560. Also, multicolor LED 542 may be disposed in groove 562. In this manner, light may be emitted into one or more light guides 508. It is understood that one or more LEDs may be in any suitable position with respect to one or more light guides 508 with surfaces 558 that are adjacent the viewing surface of the display 304.

Figure 6:
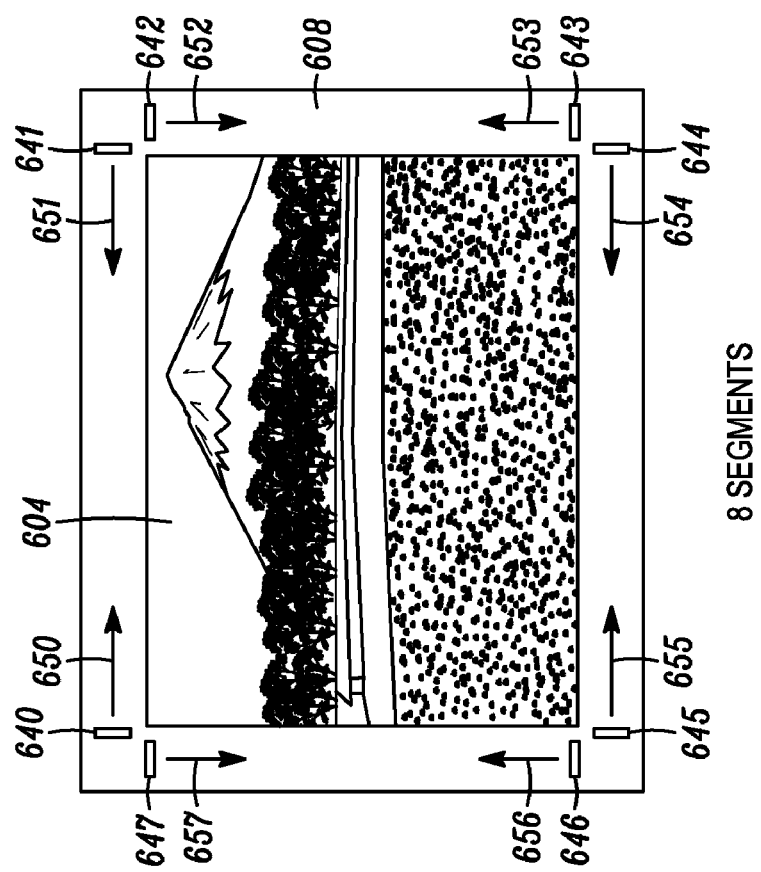
FIG. 6 depicts an embodiment of a display and the position of LEDs directing light to one or more light guides that may be adjacent the viewing surface of the display.

FIG. 6 depicts an embodiment of a display 604 and the position of LEDs directing light to one or more light guides 608 that may be adjacent the viewing surface of the display 604. In this embodiment, one or more LEDs 640, 641, 642, 643, 644, 645, 646, and 647 may direct light along one or more light guides 608 in the directions of the arrows 650, 651, 652, 653, 654, 655, 656, and 657. As in the embodiment illustrated in FIGS. 4 and 5, one or more LEDs may be disposed in a groove within the light guide 608. The degree to which the display 604 image color content may be recreated may depend upon the number of LEDs used.

Figure 7:
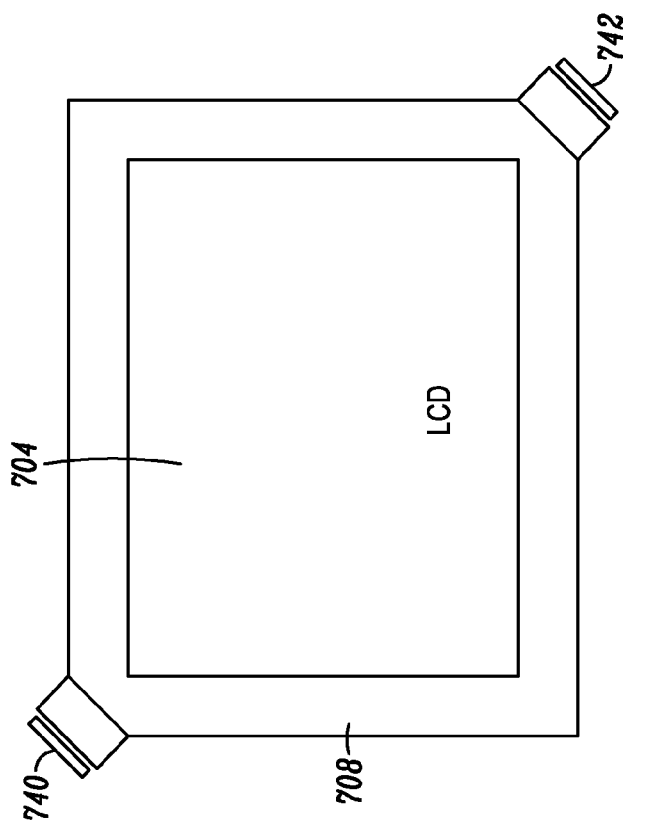
FIG. 7 depicts yet another embodiment of a display and the position of LEDs directing light to one or more light guides.

FIG. 7 depicts yet another embodiment of a display 704 and the position of LEDs 740, 742 directing light to one or more light guides 708. LEDs 740 and 742 may be positioned diagonally from one another at the corners formed by one or more light guides 708. A light guide 708 may be configured to include a front face 558 (see FIG. 5) with a light diffusing surface topology that may evenly distribute the light in a direction parallel to the display viewing surface and in a direction away from the display viewing surface.

Figure 8:
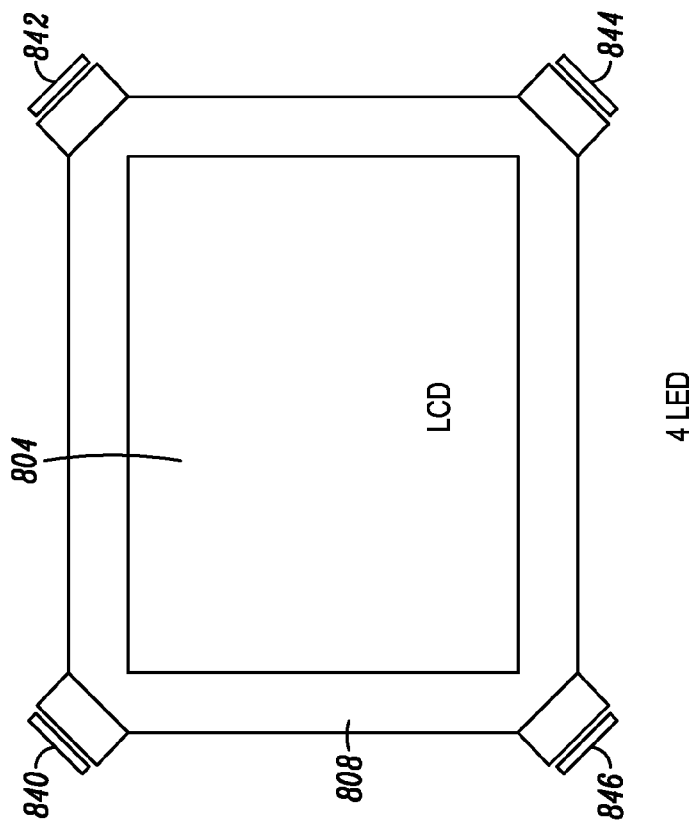
FIG. 8 depicts still another embodiment of a display and the position of LEDs directing light to one or more light guides.

FIG. 8 depicts still another embodiment of a display 804 and the position of LEDs 840, 842, 844, 846 directing light to one or more light guides 808. LEDs 840, 842, 844 and 846 may be positioned at each of the corners formed by one or more light guides 808. As in the other described embodiments, a light guide 808 may be configured to include a front face 558 (see FIG. 5) with a light diffusing surface topology that may evenly distribute the light in a direction parallel to the display viewing surface and in a direction away from the display viewing surface.

While the discussion above has focused upon the use case of the light guide 108 (see FIG. 1) directing light from one or more LEDs that is generated based on the image on the display 104 to create a bigger and/or brighter look, it is understood that there may be additional use cases for the above-described embodiments. For example, the light guide 108 may form a user interface that includes the light guide 108 adjacent the display 104 perimeter 106. The light guide 108 adjacent the display 104 perimeter 106 of the user interface, for example, may flash a predetermined color, such as red, when there is an incoming telephone call. On the other hand, the light guide 108 adjacent the display 104 perimeter 106 of the user interface may flash a different predetermined color when there is an incoming text message. Additionally, the light guide 108 adjacent the display 104 perimeter 106 of the user interface may flash another predetermined color to indicate a low charge level of the power source 116 of the device 102. It is understood that the above-described embodiments and the above-described use cases are not intended to limit the embodiments and use cases, and that any suitable embodiments and use cases are within the scope of this discussion.

Figure 9:
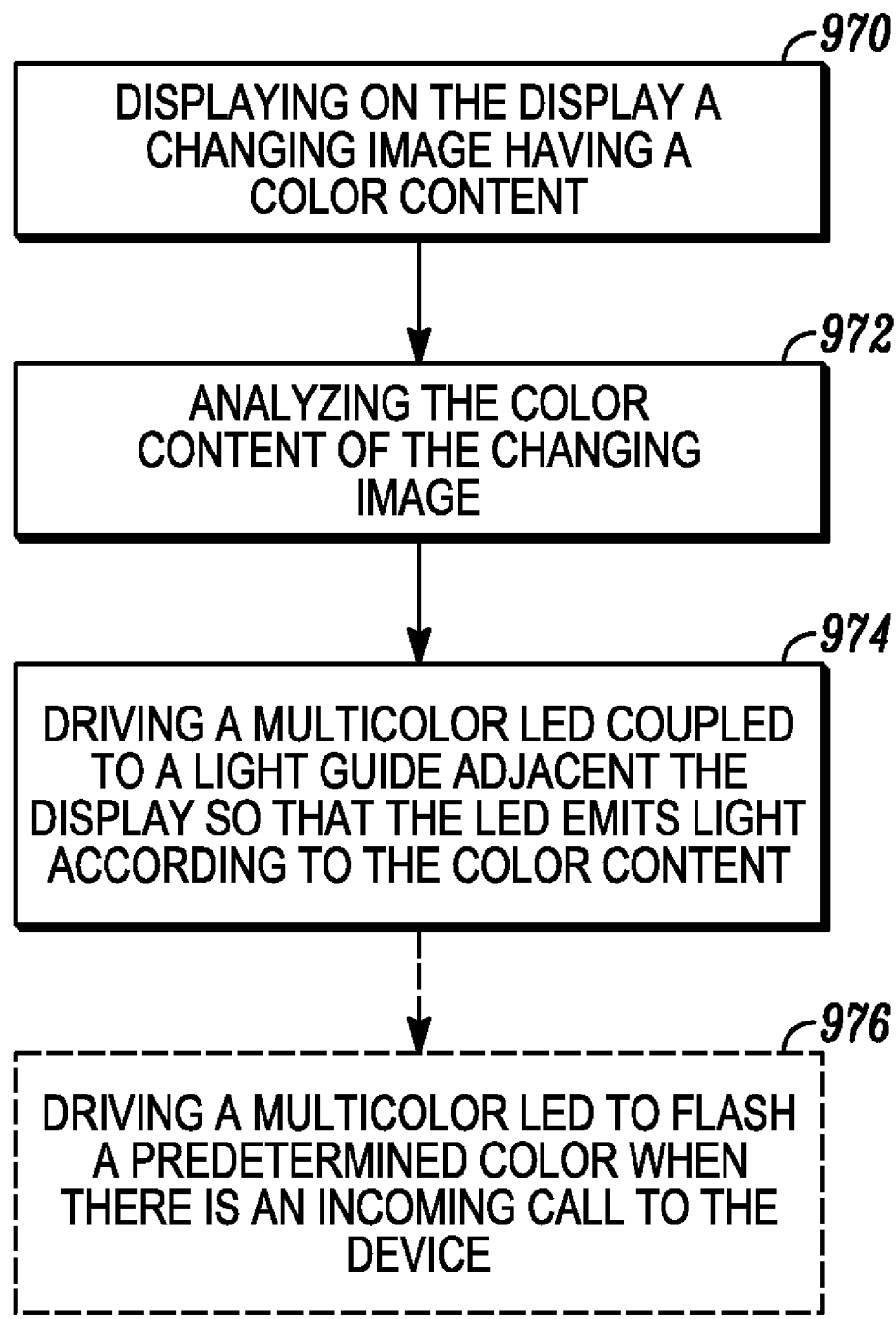
FIG. 9 illustrates a method of an electronic device including a display having a perimeter and at least one light guide adjacent the perimeter and LEDs to light the one or more light guides.

FIG. 9 illustrates a method of an electronic device including a display having a perimeter and at least one light guide adjacent the perimeter and LEDs to light the one or more light guides. FIG. 9 illustrates a method of an electronic device 102 (see FIG. 1) including displaying a changing image on a display of the electronic device, the changing image having a color content 970 in accordance with module 170, analyzing the color content of the changing image 972 in accordance with analyzing module 172, and driving a multicolor LED coupled to a light guide that is disposed adjacent the display so that the LED emits light into the light guide according to the color content of the changing image 974 in accordance with LED driving module 174. The controller 112 may receive instructions stored in the memory 118 and carry out the instructions to analyze the color and drive the LED according to the color content of a still or changing image. Additionally, the method may include driving the multicolor LED to flash a predetermined color when there is an incoming call to the mobile communication device 976.

In one embodiment, the method in FIG. 9 can further include: the changing image in 970 comprising a plurality of different image portions, each portion having a color content analyzing the color content of the changing image in 970 comprising analyzing the plurality of image portions to determine color content and driving a multicolor LED comprises driving a plurality of multicolor LEDs (for example, items 340, 342, 344 and 346 in FIG. 3, items 440, 442, 444 and 446 in FIG. 4 or items 640, 641, 642, 643, 644, 645, 646, 647 in FIG. 6) disposed adjacent an image portion of the plurality of image portions, each LED of the plurality of LEDs driven to emit light according to the color content of the image portion to which it is adjacent, as detailed herein.

As discussed above, it may be beneficial if one or more light guides positioned adjacent the viewing surface of display and lighted by one or more multicolor LEDs would create a perception that a smaller display may have a bigger and brighter look. In this manner, manufacturers may better mitigate the trade-off between the desire of consumers toward smaller devices and users' preference for bigger and brighter displays.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. An electronic device comprising:
a display having a display viewing surface and a perimeter, the display viewing surface being within the perimeter of the display, the display being configured to display images that have respective color content;
at least one multicolor LED;
at least one light guide positioned outside the perimeter of the display and adjacent to at least a portion of the perimeter of the display, the at least one light guide being configured to receive light emitted from the at least one multicolor LED and distribute the received light in directions parallel to and away from the display viewing surface such that the distributed light causes displayed images to appear larger than the display viewing surface; and
a controller coupled to the display and the at least one multicolor LED, wherein
the controller is configured to determine a color content of an image on the display and drive the at least one multicolor LED such that the at least one multicolor LED emits light according to the color content of the image.

2. The electronic device of claim 1, wherein the at least one multicolor LED comprises a side emission LED.

3. The electronic device of claim 1, wherein:
the color content of the image has a main color; and
the at least one multicolor LED is driven to emit light of the same color as the main color of the image.

4. The electronic device of claim 1, wherein:
a light guide of the at least one light guide includes a front face adjacent the display viewing surface and a rear face opposite the front face;
the light guide defines a groove in the rear face; and
a multicolor LED of the at least one multicolor LED is disposed in the groove.

5. The electronic device of claim 1, wherein:
the at least one light guide has a periphery; and
the at least one multicolor LED is coupled with the at least one light guide through a portion of the periphery.

6. The electronic device of claim 1, wherein:
a light guide of the light at least one guide includes a front face adjacent the display viewing surface; and
the light guide is configured on the front face with a light diffusing surface topology.

7. The electronic device of claim 1, wherein the electronic device is a mobile communication device.

8. The electronic device of claim 1, wherein the controller is configured to determine the color content of the image by monitoring changes in color content of images displayed over time.

9. The electronic device of claim 7, wherein the controller is further configured to drive the at least one multicolor LED such that the at least one multicolor LED flashes a predetermined color when there is an incoming telephone call.

10. The electronic device of claim 9, wherein the predetermined color is red.

11. The electronic device of claim 7, wherein the controller is further configured to drive the at least one multicolor LED such that the at least one multicolor LED flashes a predetermined color when there is an incoming text message.

12. The electronic device of claim 1, further comprising:
a power source;
wherein the controller is further configured to drive the at least one multicolor LED such that the at least one multicolor LED flashes a predetermined color to indicate a low charge level of the power source.

13. A method of an electronic device, the method comprising:
displaying an image on a display of the electronic device, the image having a color content, the display having a display viewing surface and a perimeter, wherein the display viewing surface is within the perimeter of the display;
analyzing the color content of the image; and
emitting light around at least a portion of the perimeter of the display in directions parallel to and away from the display viewing surface according to the color content of the image, such that the light emitted around the perimeter of the display causes the image to appear larger than the display viewing surface.

14. The method of claim 13, wherein emitting light around at least a portion of the perimeter of the display comprises driving at least one multicolor LED coupled to at least one light guide, wherein the at least one light guide is positioned outside the perimeter of the display and adjacent to at least the portion of the perimeter of the display, and wherein the at least one light guide is configured to receive light emitted from the at least one multicolor LED and distribute the received light in directions parallel to and away from the display viewing surface such that the distributed light causes the image to appear larger than the display viewing surface.

15. The method of claim 13, wherein:
the color content of the image has a main color; and
the light emitted around the perimeter of the display includes light of the same color as the main color.

16. The method of claim 13, wherein the electronic device is a mobile communication device, the method further comprising:
flashing a predetermined color of light around at least a portion of the perimeter of the display when there is an incoming call to the mobile communication device.

17. The electronic device of claim 1, wherein:
the image includes a plurality of image portions, each image portion having a respective color content;
the at least one multicolor LED includes a plurality of multicolor LEDs;
the at least one light guide includes a plurality of light guides;
one or more multicolor LEDs emit light into each of the plurality of light guides; and
the controller is configured to determine a color content for each image portion and drive the plurality of LEDs according to color contents of the plurality of image portions such that light emitted by the plurality of LEDs and distributed by the plurality of light guides causes the image to appear larger than the display viewing surface.

18. The method of claim 13, wherein the image includes a plurality of image portions, wherein each image portion has a respective color content, and wherein emitting light around at least a portion of the perimeter of the display comprises:
emitting light around at least a portion of the perimeter of the display in directions parallel to and away from the display viewing surface according to color contents of the image portions, such that the light emitted around the perimeter of the display causes the image to appear larger than the display viewing surface.

19. An electronic device comprising:
a display having a display viewing surface and a perimeter, the display viewing surface being within the perimeter of the display, the display being configured to display images that each include a plurality of image portions, wherein each image portion has a respective color content;
a plurality of multicolor LEDs disposed external to the perimeter of the display;
at least one light guide positioned outside the perimeter of the display and adjacent to at least a portion of the perimeter of the display, the at least one light guide being configured to receive light emitted from the plurality of multicolor LEDs and distribute the received light in directions parallel to and away from the display viewing surface such that the distributed light causes images displayed on the display to appear larger than the display viewing surface; and
a controller coupled to the display and the plurality of multicolor LEDs, wherein the controller is configured to determine color contents for the image portions of an image on the display and drive the plurality of multicolor LEDs such that the plurality of multicolor LEDs emit lights into the at least one light guide to correspond with the color contents of the image portions.

* * * * *